(12) United States Patent
Zhu et al.

(10) Patent No.: US 7,478,940 B2
(45) Date of Patent: Jan. 20, 2009

(54) BACKLIGHT MODULE

(75) Inventors: Wen-Wu Zhu, Shenzhen (CN); Ye Wu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/541,932

(22) Filed: Oct. 2, 2006

(65) Prior Publication Data
US 2007/0223246 A1   Sep. 27, 2007

(30) Foreign Application Priority Data
Mar. 22, 2006   (CN)   .................... 2006 1 0060011

(51) Int. Cl.
*F21V 7/04* (2006.01)
(52) U.S. Cl. .................. 362/611; 362/614; 362/606; 362/610; 362/615
(58) Field of Classification Search .......... 362/610, 362/611, 606, 609, 614, 600, 616, 617
See application file for complete search history.

(56) References Cited
U.S. PATENT DOCUMENTS

| | | | |
|---|---|---|---|
| 5,046,826 A * | 9/1991 | Iwamoto et al. ............... 349/65 |
| 6,039,451 A * | 3/2000 | Grave ............................ 362/29 |
| 6,755,547 B2 * | 6/2004 | Parker ........................... 362/618 |
| 7,172,327 B2 * | 2/2007 | Kuo .............................. 362/609 |
| 2004/0130911 A1 * | 7/2004 | Chen ............................. 362/558 |
| 2005/0162867 A1 * | 7/2005 | Sinofsky ...................... 362/615 |
| 2006/0092667 A1 * | 5/2006 | Peng ............................ 362/615 |
| 2006/0204744 A1 * | 9/2006 | Hiraishi et al. ............... 428/327 |
| 2007/0103938 A1 * | 5/2007 | Chang et al. ................. 362/617 |
| 2007/0165422 A1 * | 7/2007 | Iwasaki ........................ 362/615 |
| 2007/0171677 A1 * | 7/2007 | Yano et al. ................... 362/614 |

FOREIGN PATENT DOCUMENTS
TW   1225543   12/2004

\* cited by examiner

*Primary Examiner*—Ali Alavi
*Assistant Examiner*—Evan Dzierzynski
(74) *Attorney, Agent, or Firm*—Morris Manning Martin LLP; Tim Tingkang Xia, Esq.

(57) ABSTRACT

A backlight module includes a lamp tube, a light guide plate and a light guide unit. The light guide plate has a light incident side. The light guide unit is in contact with the light incident side of the light guide plate. The light guide unit and the light incident side cooperatively form a receiving tunnel. The lamp tube is disposed in the receiving tunnel. The light guide unit is detachable from the light guide plate. Another backlight module is also provided. The present backlight module can be assembled conveniently and quickly, and has a relatively high light energy utilization rate.

16 Claims, 4 Drawing Sheets

BACKLIGHT MODULE

TECHNICAL FIELD

The present invention relates to backlight modules, more particularly, to edge lighting type backlight modules for use in, for example, a liquid crystal display (LCD).

BACKGROUND

In a typical liquid crystal display, a backlight module is used to provide a planar light source for illuminating the liquid crystal display. In general, the backlight module includes a light source and a light guide plate, the light source disposed at a side of the light guide plate. The light guide plate transforms diverging light rays emitted from the light source into planar light rays, and directs the planar light rays to a liquid crystal panel of the liquid crystal display.

Referring to FIG. 6, a typical backlight module 10 is shown. The backlight module 10 includes a light guide plate 11, a lamp tube 12, a reflector 13, a reflective plate 14, and a plurality of optical sheets such as a light diffusion plate 15, first and second prism sheet 16 and 17. The light guide plate 11 includes a light reflective surface 112 and a light emitting surface 113 on opposite sides of the light guide plate 1, and further includes a light incident surface 111 adjoining the light reflective surface 112 and the light emitting surface 113. The lamp tube 12 is disposed adjacent to the light incident surface 111 of the light guide plate 11. The reflector 13 partly surrounds the lamp tube 12 and reflects light rays projecting out of the lamp tube 12 to the light guide plate 11. The reflective plate 14 is positioned underneath the light reflective surface 112 for reflecting light rays projecting out of the reflective surface 112 back into the light guide plate 11. The light diffusion plate 15 and the first and second prism sheets 16 and 17 are stacked on the light emitting surface 113 for diffusing emitted light rays and collimating the emitted light rays uniformly to improve a brightness uniformity.

When the backlight module 10 is in use, light rays from the lamp tube 12 pass through the light incident surface 111 and enter the light guide plate 11. The light rays are reflected and refracted by the light guide plate 11 before surface light rays are outputted from the light emitting surface 113. However, the elements of the backlight module 10, such as the light guide plate 11, the lamp tube 12, and the reflector 13 are normally not compactly attached together, thus, gaps exist therebetween. An amount of light rays emitted from the lamp tube 12 escapes through these gaps, and are not emitted to the light guide plate 11, thereby utilization of the light rays is reduced.

Referring to FIG. 7, in order to overcome the above mentioned shortcoming, another typical backlight module 20 is provided. The backlight module 20 is similar to the backlight module 10, except that a light guide plate 21 is different from the light guide plate 11. The light guide plate 21 defines a receiving tunnel 211 in an end thereof. A lamp tube 22 is inserted into the receiving tunnel 211. Accordingly, light rays from the lamp tube 22 could be substantially reflected and refracted into the light guide plate 21, with a significantly small amount of light rays escaping through the gaps between the light guide plate 21 and a reflector 23.

However, the backlight module 20 is not conveniently assembled. Referring to FIG. 8, typically, two electrodes (not shown) of the lamp tube 22 are electrically connected to two lamp wires 222 correspondingly. The two electrodes of the lamp tube 22 are correspondingly inserted into two electrode holders 221 that have a lamp wire 222 that passes through each electrode holder 221. An end of each lamp wire 222 is connected to a connector 223. The lamp tube 22 can be electrically connected to an external electric power (not shown) via the two lamp wires 222 and the connector 223. Since a size of the electrode holder 221 is larger than a diameter of the receiving tunnel 211, the lamp tube 22 assembled with the two electrode holders 221 cannot be inserted into the receiving tunnel 211 directly. Accordingly, when the backlight module 20 is assembled, the lamp tube 22 should be inserted into the receiving tunnel 211 of the light guide plate 21 first before the lamp wires 222 are electrically welded to the electrodes of the lamp tube 22. Afterwards, the electrode holders 221 are assembled to fix the electrodes of the lamp tube 22 on an exterior of the light guide plate 21. The lamp wires 222 are introduced out from the corresponding electrode holder 221. Therefore, assembling the backlight module 20 is complicated and difficult. In addition, pattern dots 213 formed on a light reflective surface 212 of the light guide plate 21 are prone to being damaged when assembling the lamp wires 222 and electrode holders 221, thus the backlight module 20 has a relatively poor optical performance. Furthermore, the light guide plate 21 is typically manufactured by using an injection molding method/technology, thereby forming the receiving tunnel 211 in the light guide plate 21 is complex and costly.

What is needed, therefore, is a backlight module that overcome the above mentioned shortcomings.

SUMMARY

A backlight module according to a preferred embodiment includes a lamp tube, a light guide plate and a light guide unit. The light guide plate has a light incident side. The light guide unit is disposed in contact with the light incident side of the light guide plate. The light guide unit and the light incident side cooperatively form a receiving tunnel. The lamp tube is positioned in the receiving tunnel.

Another backlight module according to a preferred embodiment includes a lamp tube, a light guide plate and a light guide unit. The light guide plate has a light incident side. The light guide unit is disposed in contact with the light incident side of the light guide plate tightly. The light guide unit defines a receiving tunnel therein. The lamp tube is disposed in the receiving tunnel.

Other advantages and novel features will become more apparent from the following detailed description of the preferred embodiments, when taken in conjunction with the accompanying drawings.

BRIEF DESCRIPTION OF THE DRAWINGS

Many aspects of the present backlight module can be better understood with reference to the following drawings. The components in the drawings are not necessarily drawn to scale, the emphasis instead being placed upon clearly illustrating the principles of the present backlight module. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present backlight module, in detail.

Figure 1:
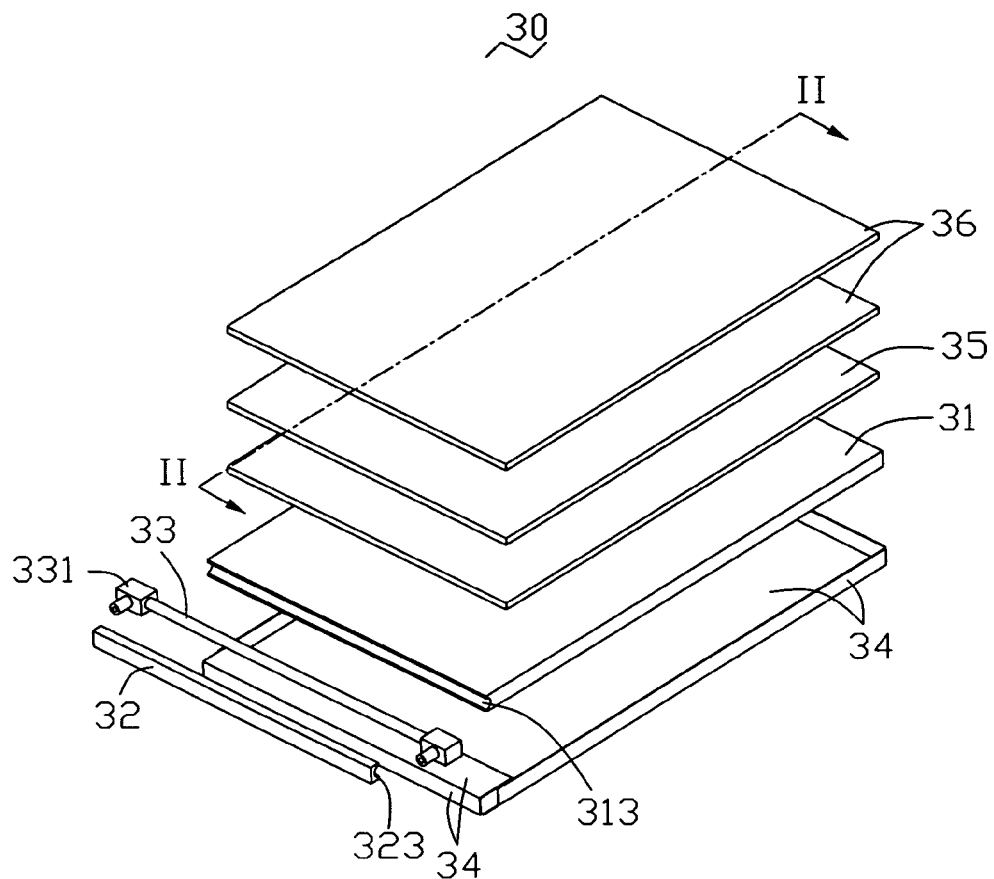
FIG. 1 is a schematic, exploded isometric view of a backlight module according to a first preferred embodiment.
Figure 2:
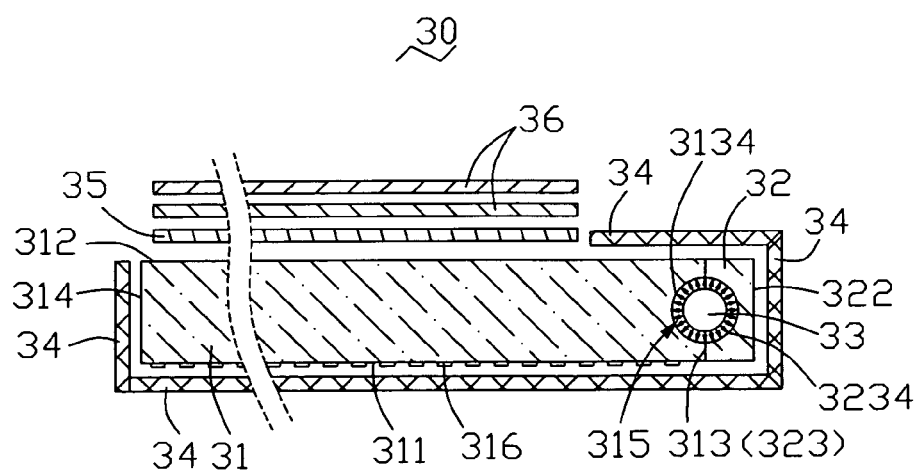
FIG. 2 is a schematic, cross-sectional view taken along a II-II line of FIG. 1.

Referring to FIGS. 1 and 2, a backlight module 30 in accordance with a first preferred embodiment is shown. The backlight module 30 includes a light guide plate 31, a light guide unit 32 and a lamp tube 33. The light guide plate 31 is a rectangular sheet, or alternatively may be generally cuneiform. The light guide plate 31 includes a light reflective surface 311 and a light emitting surface 312 on opposite sides of the light guide plate 31, and further includes a light incident side 313 adjoining the light reflective surface 311 and the light emitting surface 312. A first elongated depression 3134 is defined on the light incident side 313. A plurality of microstructures 316 such as pattern dots, semi-spherical projections or grooves, or V-shaped projections or grooves and so on, is formed on the light reflective surface 311 for uniformly reflecting light rays towards the light emitting surface 312. A material of the light guide plate 31 is selected from a group comprising of polymethyl methacrylate (PMMA), polycarbonate (PC), polystyrene (PS), or other suitable transparent resin materials. In this embodiment, the microstructures 316 are pattern dots and the light guide plate 31 employs PMMA.

The light guide unit 32 is disposed adjacent the light incident side 313 of the light guide plate 31. The light guide unit 32 is an elongated cuboid, except that a side 323 facing the light incident side 313 thereof also defines a second elongated depression 3234 thereon. The light incident side 313 of the light guide plate 31 and the side 323 of the light guide unit 32 cooperatively form a receiving tunnel 315 formed by the first elongated depression 3134 and the second elongated depression 3234. In this embodiment, a shape of the receiving tunnel 315 is cylindrical. It is to be understood that the receiving tunnel 315 could also be configured to be one of a cuboid and other similar shapes. The light guide unit 32 and the light guide plate 31 can be preferably formed of a same resin material, provided that the light guide plate 31 is sufficiently transparent and the light guide unit 32 transparent or opaque. However, the light guide plate 31 and the light guide unit 32 can also be formed with different resin materials.

The lamp tube 33 is disposed in the receiving tunnel 315. The lamp tube 33 employs a cold cathode fluorescent lamp. Two electrodes of the lamp tube 33 are electrically connected to two lamp wires (not shown) correspondingly. An electrode holder 331 is placed over each of the electrodes of the lamp tube 33.

When assembling, the lamp tube 33, the lamp wires and the electrode holders 331 can be initially assembled together separately thereat. The lamp tube 33 assembled with the lamp wires and the electrode holders 331 are then positioned adjacent to the first elongated depression 3134 of the light incident side 313 of the light guide plate 31. Afterwards, the light guide unit 32 is positioned adjacent to the light incident side 313 to cooperatively form the receiving tunnel 315 with the light guide plate 31, thus, confining the lamp tube 33 in the receiving tunnel 315.

It is to be understood that the backlight module 30 may further include a plurality of reflective plates 34 that cooperatively surround the light guide plate 31 and the light guide unit 32 excluding the light emitting surface of the light guide plate 31. The reflective plates 33 can help to increase light energy utilization rate of the whole backlight module.

In order to improve the backlight module 30's optical uniformity and brightness, the backlight module 30 may further include a light diffusion film 35 and two prism sheets 36 stacked above the light emitting surface 312 of the light guide plate 31 in that order. When the backlight module 30 is in use, substantial light rays emitted from the lamp tube 33 enter into the light guide plate 31 via the first elongated depression 3134, thus the utilization of the light rays is increased.

Figure 3:
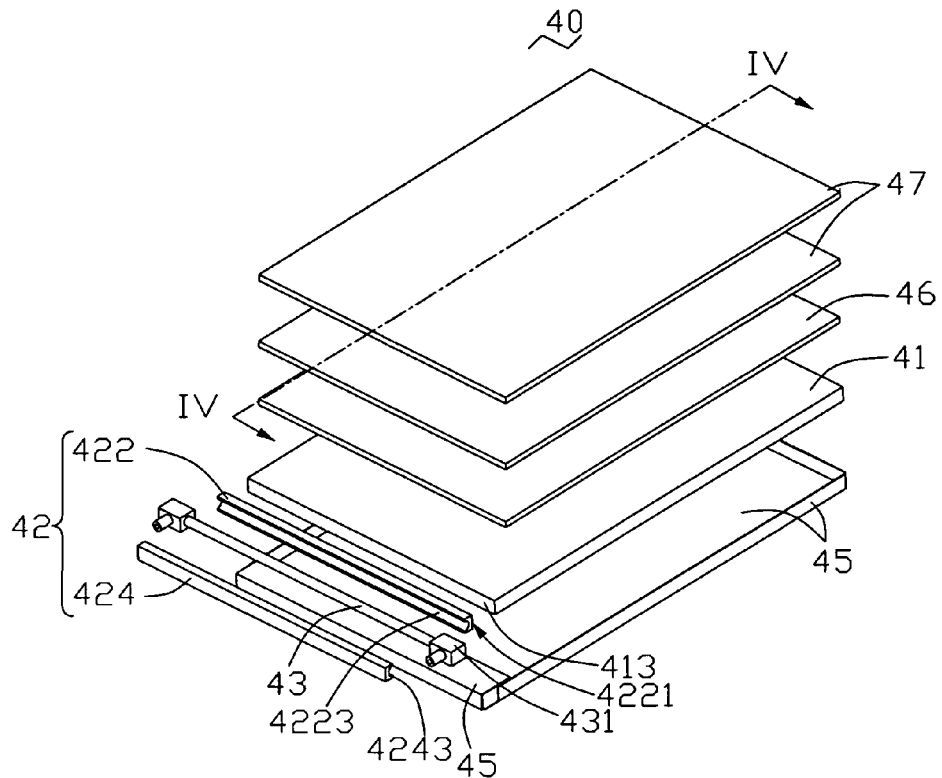
FIG. 3 is a schematic, exploded isometric view of a backlight module according to a second preferred embodiment.
Figure 4:
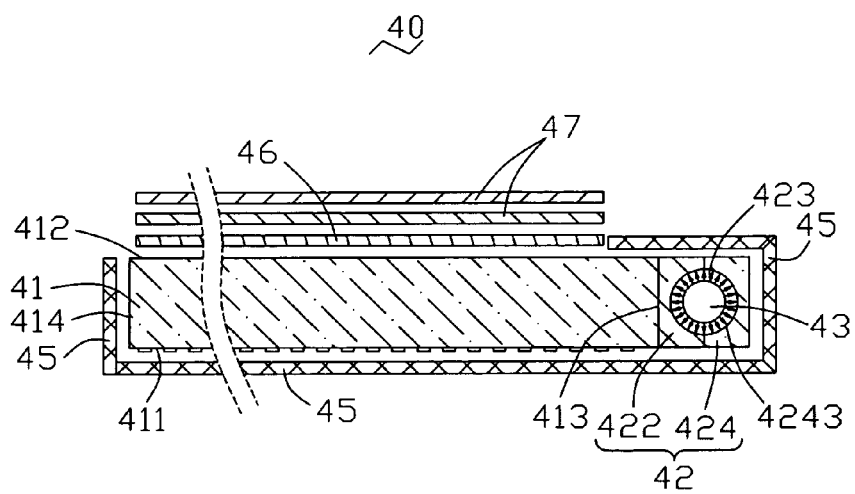
FIG. 4 is a schematic, cross-sectional view taken along a IV-IV line of FIG. 3.

Referring to FIGS. 3 and 4, a backlight module 40 in accordance with a second preferred embodiment is shown. The backlight module 40 includes a light guide plate 41, a light guide unit 42 having a first light guide member 422 and a second light guide member 424, and a lamp tube 43. The light guide plate 41 includes a light incident surface 413, a light emitting surface 412, and a light reflective surface 411. The light guide plate 41 is similar to the light guide plate 31 of the first embodiment, except that the light incident surface 413 is a flat surface.

The light guide unit 42 is disposed in contact with the light incident surface 413 of the light guide plate 41. The first light guide member 422 is an elongated rod, which includes a first surface 4221 in contact with the light incident surface 413, a second surface 4223 opposite to the first surface 4221. A first elongated depression (not labeled) is defined on the second surface 4223 of the first light guide member 422. The second light guide member 422 is also an elongate rod, which includes a third surface 4243, and a second elongated depression (not labeled) defined on the third surface 4243. A part of the third surface 4243 is in contact with the second surface 4223 of the first light guide member 422. The third surface 4243 of the second light guide member 424 and the second surface 4223 of the first light guide member 422 cooperatively define a receiving tunnel 423. The lamp tube 43 is inserted into the receiving tunnel 423.

The first light guide member 422 and the second light guide member 424 can be preferably formed of a same resin material, provided that the first light guide member 422 is sufficiently transparent and the second light guide member 424 transparent or opaque. However, the first light guide member 422 and the second light guide member 424 can also be formed with dissimilar resin materials.

The backlight module 40 may further include a plurality of reflective plates 45 cooperatively inclusively surrounding the light guide plate 41 and the light guide unit 42. The reflective plates 45 can help to increase light energy utilization rate of the whole backlight module. The backlight module 40 may further include a light diffusion film 46 and two prism sheets 47 stacked in that order on the light emitting surface 412 of the light guide plate 41.

Figure 5:
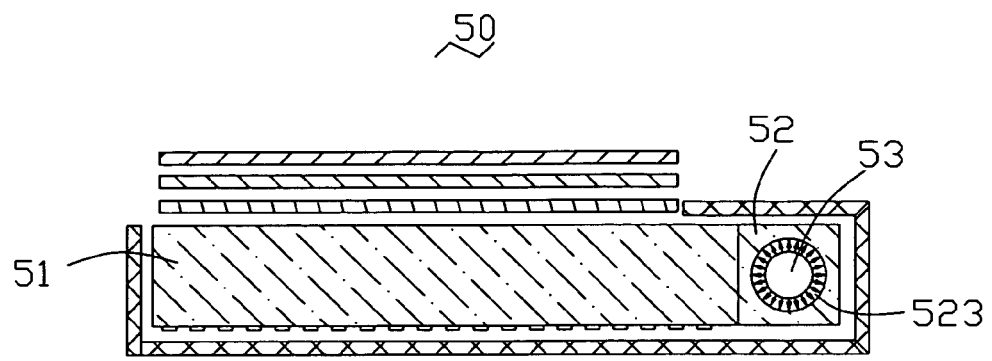
FIG. 5 is a schematic, cross-sectional view of a backlight module according to a third preferred embodiment.
Figure 6:
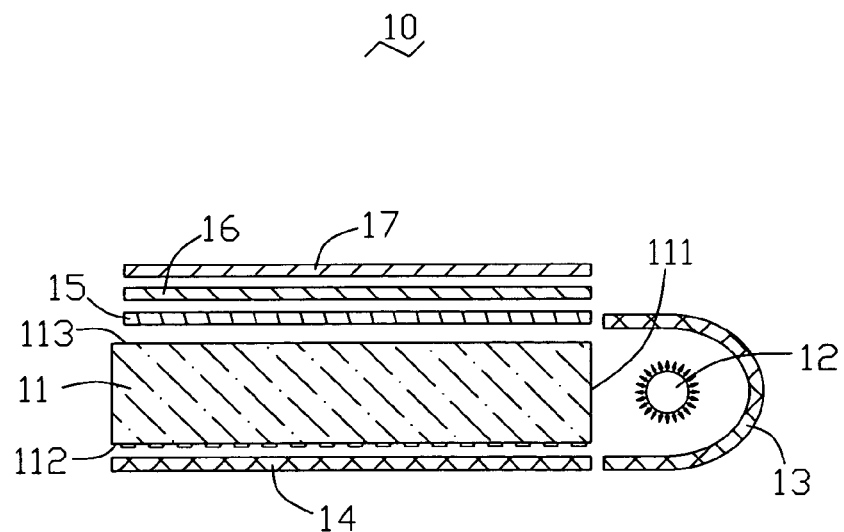
FIG. 6 is a schematic, cross-sectional view of a conventional backlight module.
Figure 7:
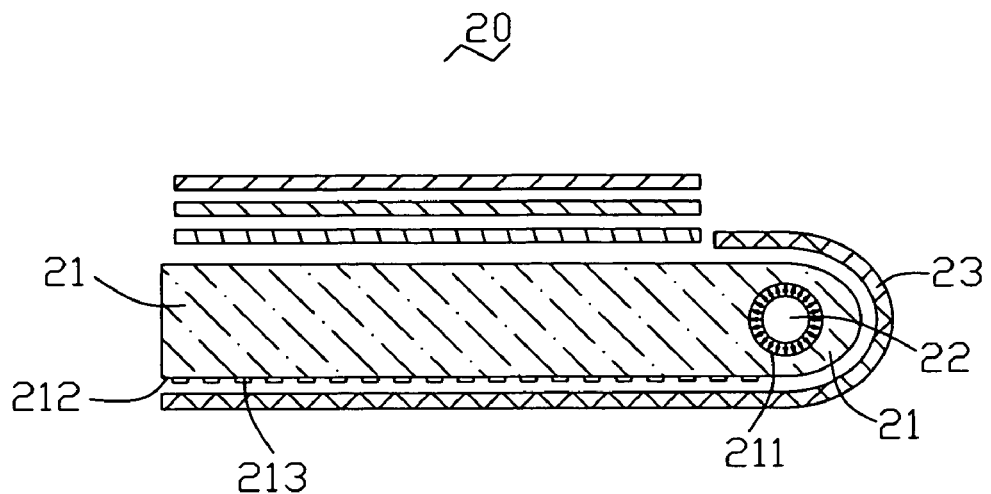
FIG. 7 is a schematic, cross-sectional view of another conventional backlight module.
Figure 8:
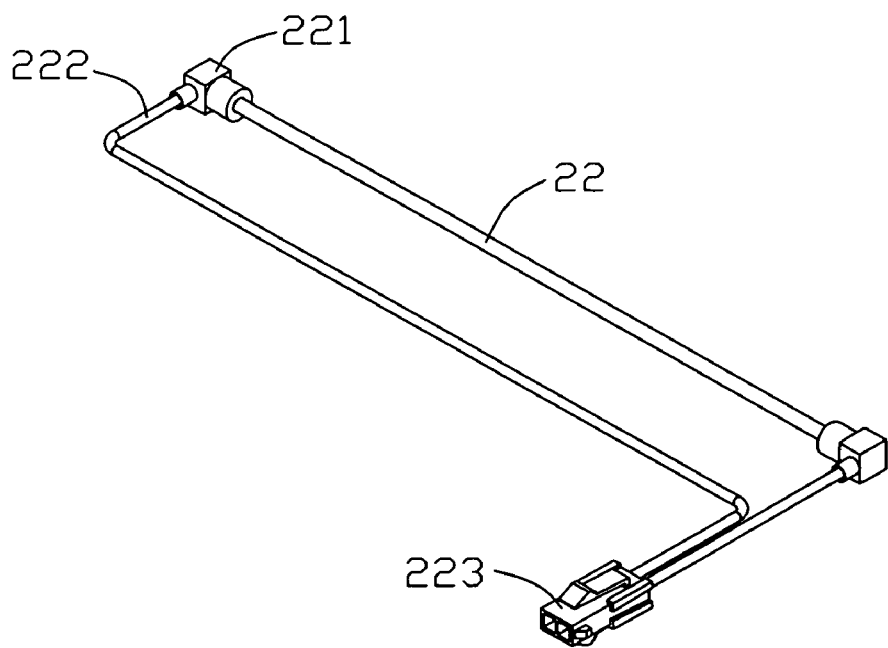
FIG. 8 is a schematic, isometric view of a lamp tube, two lamp wires and a connector of the backlight module shown in FIG. 7.

Referring to FIG. 5, a backlight module 50 in accordance with a third preferred embodiment is shown. The backlight module 50 is similar in principle to that of the second embodiment, except that the light guide unit 52 is an elongated cuboid whose length along a direction parallel to the light incident surface matches with the light guide plate 51. The light guide unit 52 defines a receiving tunnel 523 therein along a direction parallel to a light incident surface (not labeled) of the light guide plate 51. A lamp tube 53 is positioned in the receiving tunnel 523. It is to be understood that the light guide unit 52 could be integrally formed by combining with structures of the first light guide member 422 and the second light guide member 424 of the second embodiment.

Compared with assembling the conventional backlight module, a rate of assembling the present backlight module is increased and it is easy to mass produce the present backlight module by way of these assembling processes, because the lamp tube, the lamp wires, and the electrode holders can be assembled together separately. In addition, microstructures on a light reflective surface of the light guide plate can avoid being damaged when assembling the present backlight module. Furthermore, the present backlight module has a highly light energy utilization rate because light rays from the lamp tube substantially enter into the light guide plate via the light incident side.

It should be pointed out that the shape of light guide unit of the present backlight module is not limited to the illustrated embodiments. The present light guide unit can have other suitable shapes as long as the light guide unit can be combined with the light guide plate to form a receiving tunnel or the light guide unit has a receiving tunnel separately and match with the light guide plate.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A backlight module comprising:
   a lamp tube;
   a light guide plate having a light reflective surface, a light emitting surface, and a light incident side, the light reflective surface and the light emitting surface being on opposite sides of the light guide plate, the light incident side adjoining the light reflective surface and the light emitting surface; and
   a light guide unit disposed in contact with the light incident side of the light guide plate, wherein the light guide unit is detachable from the light guide plate and the lamp tube, and the light guide unit and the light incident side cooperatively forms a receiving tunnel, the lamp tube being disposed in the receiving tunnel.

2. The backlight module according to claim 1, wherein the light incident side of the light guide plate defines a first elongated depression thereon, and a side facing the light incident side of the light guide unit also defines a second elongated depression thereon, the first elongated depression and the second elongated depression cooperatively forming the receiving tunnel.

3. The backlight module according to claim 2, wherein a shape of the receiving tunnel is configured to be one of a cylinder and a cubiod.

4. The backlight module according to claim 1, wherein the light guide plate further comprises a plurality of microstructures formed on the light reflective surface.

5. The backlight module according to claim 1, further comprising a plurality of reflective plates cooperatively surrounding the light guide plate and the light guide unit excluding the light emitting surface of the light guide plate.

6. The backlight module according to claim 1, wherein the light guide unit and the light guide plate are formed of same resin material, provided the light guide plate is sufficiently transparent and the light guide unit transparent or opaque.

7. The backlight module according to claim 6, wherein the light guide unit and the light guide plate are selected from a group comprising of polymethyl methacrylate, polycarbonate, polystyrene.

8. The backlight module according to claim 1, further comprising a light diffusion film and two prism sheets stacked on the light emitting surface of the light guide plate in that order.

9. The backlight module according to claim 1, wherein the lamp tube is a cold cathode fluorescent lamp.

10. A backlight module comprising:
    a lamp tube;
    a light guide plate having a light reflective surface, a light emitting surface, and a light incident side, the light reflective surface and the light emitting surface being on opposite sides of the light guide plate, the light incident side adjoining the light reflective surface and the light emitting surface; and
    a light guide unit disposed in contact with the light incident side of the light guide plate, the light guide unit defining a receiving tunnel therein, the lamp tube being disposed in the receiving tunnel, wherein the light guide unit is detachable from the light guide plate and the lamp tube.

11. The backlight module according to claim 10, wherein the light guide plate further comprises a plurality of microstructures formed on the light reflective surface.

12. The backlight module according to claim 10, further comprising a plurality of reflective plates cooperatively surrounding the light guide plate and the light guide unit excluding the light emitting surface of the light guide plate.

13. The backlight module according to claim 10, wherein the light guide unit and the light guide plate are formed of same material, the light guide unit and the light guide plate being selected from a group comprising of transparent polymethyl methacrylate, polycarbonate, polystyrene.

14. The backlight module according to claim 10, wherein the second surface of the first light guide member defines a first elongated depression thereon, and the third surface of the second light guide member also defines a second elongated depression thereon, the first elongated depression and the second elongated depression cooperatively forming the receiving tunnel.

15. The backlight module according to claim 10, wherein the first light guide member and the second light guide member employ same material.

16. The backlight module according to claim 10, further comprising a light diffusion film and two prism sheets stacked on the light emitting surface of the light guide plate in that order.

* * * * *